UNITED STATES PATENT OFFICE.

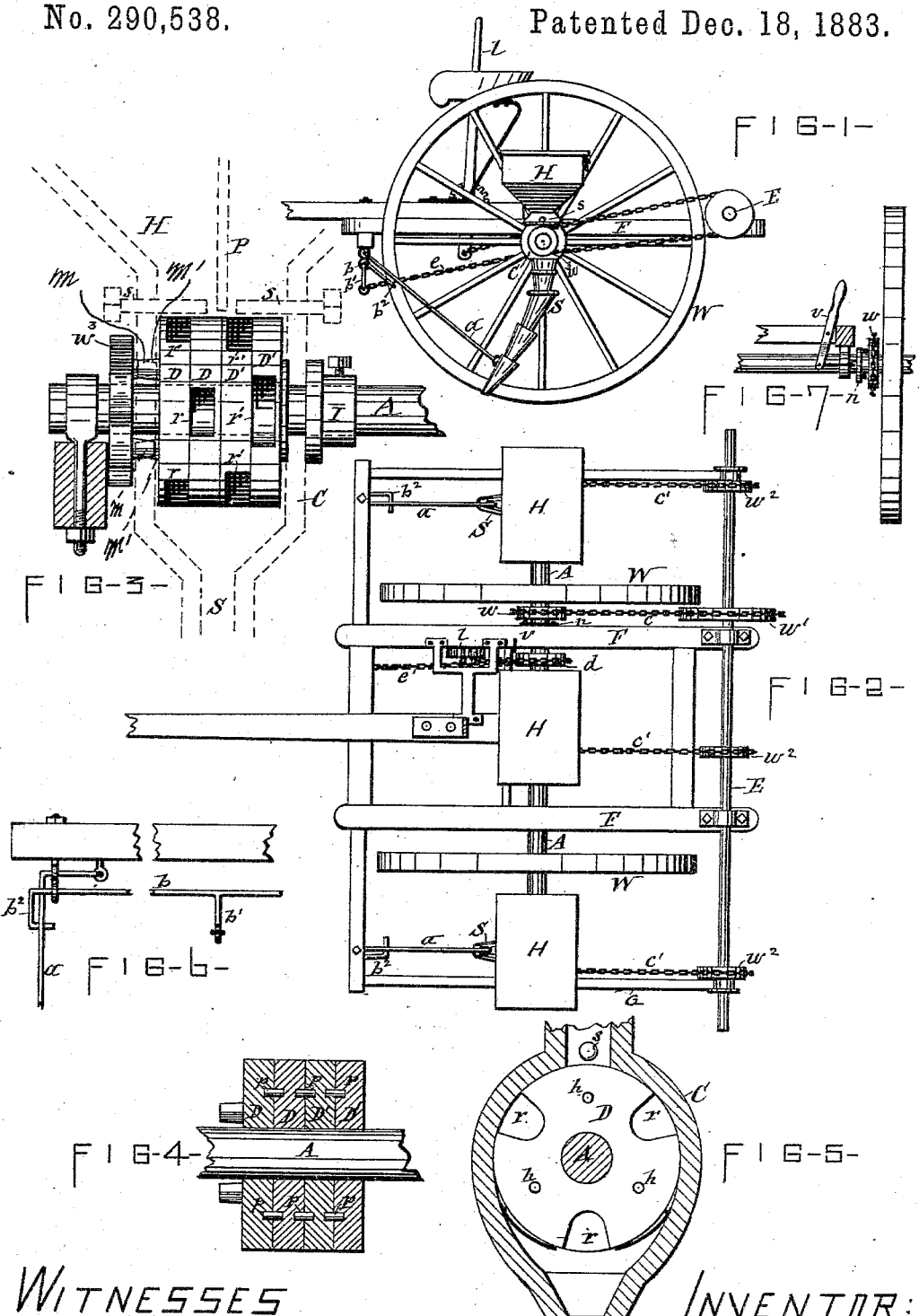

JAMES W. COOK, OF MORAVIA, NEW YORK, ASSIGNOR OF ONE-HALF TO WILLIAM S. PARKER, OF SAME PLACE.

COMBINED PLANTER AND FERTILIZER-DISTRIBUTER.

SPECIFICATION forming part of Letters Patent No. 290,588, dated December 18, 1883.

Application filed April 24, 1883. (No model.)

*To all whom it may concern:*

Be it known that I, JAMES W. COOK, of Moravia, in the county of Cayuga, in the State of New York, have invented new and useful Improvements in a Combined Planter and Fertilizer-Distributer, of which the following, taken in connection with the accompanying drawings, is a full, clear, and exact description.

This invention consists in a novel and simple construction of the feed-disks and their connection with each other, which allows them to be readily interchanged with other disks adapted for operating on different kinds of seed; and the invention also consists in certain other peculiarities of the details of the feed mechanism, all as hereinafter more fully described, and specifically set forth in the claims.

In the annexed drawings, Figure 1 is a side elevation of my invention. Fig. 2 is a plan view of the same. Fig. 3 is an enlarged detail view of the seed and fertilizer feed disks or wheels, their inclosing-case and hopper being represented by dotted lines. Fig. 4 is a vertical transverse section of the same. Fig. 5 is a vertical section taken on a plane at right angles to the axes of the aforesaid disks, and including the inclosing-case thereof. Fig. 6 is a detail view of the devices for regulating the distributing-tube in its entry into the ground, and Fig. 7 is a detached view of the devices for throwing the actuating mechanism of the seed and fertilizer distributer in and out of gear with the driving-shaft.

Like letters of reference denote like parts in all the figures.

F represents a horizontal frame mounted on the axle A of the traction-wheels W W, to which said axle is fixed, so as to rotate therewith. The axle is extended beyond the outer side of the wheels W sufficiently to carry on each of its extremities a set of seed and fertilizer distributing mechanism, hereinafter described, another set of said mechanism being mounted on the center of the axle A, and thus giving the machine a capacity of planting three rows at a time.

The aforesaid mechanism consists of two sets of two vertical disks or wheels each, D D and D' D', mounted loosely on the axle, and placed in juxtaposition and locked together by means of pins $p\,p$, interposed between said disks and entering holes $h\,h$ in the adjacent faces thereof, as illustrated in Figs. 4 and 5 of the drawings. The several disks are provided in their periphery with recesses $r\,r$, so arranged that the recesses of one disk come intermediately of those of the adjacent disk. The recesses of one set of disks are of proper size to carry the desired number of seeds, while those of the other set, D' D', are larger or of the necessary size to carry the fertilizer. Said two sets of disks are inclosed in a case, C, supported on the axle A, and maintained in their position by a collar, I, clamped on the axle on one side of the case, and a bar, G, of an extension of the frame F, riding on the axle on the outside of the case, as shown in Fig. 3 of the drawings. The case C, which is supported on the center of the axle, is held in place by two collars on the axle at opposite sides of the case, said latter fastenings being so common as not to require an illustration.

From the bottom of the case C is extended a spout, S, which conveys the seed and fertilizer into the ground in the usual manner.

H denotes the hopper secured to and communicating with the upper part of the case C. Said hopper is divided into two compartments by a partition, P, placed directly over the junction of the two sets of disks D D and D' D', as shown by dotted lines in Fig. 3 of the drawings, the compartment over the disks D D being designed for the reception of the seed to be planted, while the other compartment is to receive the fertilizer to be distributed simultaneously with the seed. The feed of the seed and fertilizer to the respective disks in the case is regulated by means of set-screws $s\,s$, inserted through the sides of the case directly above the periphery of the disks, a greater or less inward projection of said set-screws producing a greater or less obstruction in the passage from the hopper to the recesses of the disks, and consequently a slower or faster flow of the seed and fertilizer. The described disks D D and D' D' receive motion from the axle A by the following instrumentalities:

On the axle A is loosely mounted a sprocket-wheel, $w$, at the side of which is a clutch, $n$, of ordinary construction, and sliding on a feather of the axle in the usual way, as illustrated in Fig. 7 of the drawings. A lever, $v$, fulcrumed on the frame and suitably connected with the clutch, serves to throw the latter in and out of connection with the sprocket-wheel $w$, and thus allows said wheel to be set in motion, when desired.

Across the rear end of the frame F is extended a counter-shaft, E, to which is attached a sprocket-wheel, $w'$, which is connected with the wheel $w$ by a driving-chain, $c$. Three other sprocket-wheels $w^2$ are attached to the counter-shaft at points to bring them, respectively, in range with the sprocket-wheels $w^3$, which are mounted on the axle A at the side of three cases, C, the latter wheels having on the side adjacent to the case lugs $m\ m$, which project through an opening in the case, and engage with the lugs $m'\ m'$ on the outer face of the first of the set of disks D. The sprocket-wheels $w^3$, being connected with the sprocket-wheels $w^2$ by endless drive-chains $c'$, transmit motion from the counter-shaft E to the disks D D D' D'.

In the rotation of said disks the seed and fertilizer drop from the hopper H into the recesses $r$ and $r'$ of the disks, and are carried then around to the bottom of the case, where they drop out of said recesses and into the spout S, which conveys them into the ground, to be planted, the seed and fertilizer escaping through the same tube simultaneously, thus applying the fertilizer in a most economical and yet most effective manner at one operation.

To regulate the tube S to the depth to be planted, I make the said tube of flexibly-connected sections, and connect the lower or free end thereof with the forward end of the frame F by a vibratory rod, $a$, and along the aforesaid end of the frame F, I connect a rock-shaft, $b$, which has laterally-projecting arms $b^2$, one for each tube S, said arms being extended under the rod $a$, as best seen in Figs. 2 and 6 of the drawings.

Another arm, $b'$, projecting from the rock-shaft, has connected to it a chain or rope, $e$, which passes around a pulley, $d$, on the axle A, and is connected to the lower end of a lever, $l$, fulcrumed on the frame F. By throwing the upper end of said lever rearward the lower end thereof draws upon the chains $e$, and thereby turns the rock-shaft $b$, so as to cause the arm $b^2$ thereof to pry up the rod $a$, and thus lift the tube S.

Having described my invention, what I claim as new, and desire to secure by Letters Patent, is—

1. In combination with the axle A and case C, the disks D D D' D', provided in their adjacent sides, respectively, with the recesses $r$ $r'$ and holes $h\ h$, and the coupling-pins $p\ p$ in said holes, substantially in the manner described and shown.

2. The combination of the disks D D D' D', provided in their adjacent sides with the pockets or recesses $r\ r'$ and holes $h\ h$, coupling-pins $p\ p$, lugs $m'\ m'$, attached to the outer disk, and the wheel $w^3$, provided with lugs $m\ m$, substantially as described and shown.

In testimony whereof I have hereunto signed my name and affixed my seal, in the presence of two attesting witnesses, at Syracuse, in the county of Onondaga, in the State of New York, this 2d day of April, 1883.

JAMES W. COOK. [L. S.]

Witnesses:
 FREDERICK H. GIBBS,
 WILLIAM C. RAYMOND.